(12) United States Patent
Gorke et al.

(10) Patent No.: US 11,852,060 B2
(45) Date of Patent: Dec. 26, 2023

(54) SHEATHING ARRANGEMENT AND PROCESS FOR MANUFACTURING A SHEATHING ARRANGEMENT FOR AN EXHAUST SYSTEM OF AN INTERNAL COMBUSTION ENGINE

(71) Applicant: Purem GmbH, Neunkirchen (DE)

(72) Inventors: Peter Gorke, Stuttgart (DE); Frank Hempel, Bexbach (DE)

(73) Assignee: PUREM GMBH, Neunkirchen (DE)

( * ) Notice: Subject to any disclaimer, the term of this patent is extended or adjusted under 35 U.S.C. 154(b) by 0 days.

(21) Appl. No.: 17/219,086

(22) Filed: Mar. 31, 2021

(65) Prior Publication Data
US 2021/0309166 A1    Oct. 7, 2021

(30) Foreign Application Priority Data

Apr. 2, 2020 (DE) ..................... 10 2020 109 186.9

(51) Int. Cl.
*F01N 13/10*    (2010.01)
*F01N 13/14*    (2010.01)
*F01N 3/28*     (2006.01)
*B60R 13/08*    (2006.01)

(52) U.S. Cl.
CPC ...... *F01N 13/14* (2013.01); *B60R 2013/0807* (2013.01); *F01N 3/2853* (2013.01); *F01N 13/102* (2013.01); *F01N 13/141* (2013.01); *F01N 2510/02* (2013.01)

(58) Field of Classification Search
CPC ...... F01N 13/14; F01N 3/2853; F01N 13/102; F01N 13/141; F01N 2510/02; F01N 2310/00; F01N 13/185; F01N 13/1872; F01N 13/1888; F01N 1/24; F01N 13/007; F01N 13/148; F01N 13/16; B60R 2013/0807
USPC ....................................................... 138/149
See application file for complete search history.

(56) References Cited

FOREIGN PATENT DOCUMENTS

| CA | 3066242 A1 | * | 2/2020 | ............. F16L 59/10 |
|---|---|---|---|---|
| CN | 106285891 A | | 1/2017 | |
| CN | 110671181 A | | 1/2020 | |
| EP | 3591182 A1 | | 1/2020 | |
| JP | H094449 A | | 1/1997 | |
| JP | 2000356129 A | | 12/2000 | |
| JP | 2015175327 A | | 10/2015 | |

* cited by examiner

*Primary Examiner* — Huy Tram Nguyen
(74) *Attorney, Agent, or Firm* — McGlew and Tuttle, P.C.

(57) ABSTRACT

A sheathing arrangement for an exhaust system of an internal combustion engine includes at least one sheathing element (18) with a sheathing element shell (19). On an inner side (30) of the sheathing element shell (19) insulation material (38) overlaps the inner side (30) in at least some areas. The inner side is to be positioned facing toward a component of an exhaust system (10), which component is to be sheathed. The insulation material (38) is fixed to the sheathing element shell (19) by means of at least one fastening element (40) passing through the sheathing element shell (19) and the insulation material (38).

18 Claims, 2 Drawing Sheets

SHEATHING ARRANGEMENT AND PROCESS FOR MANUFACTURING A SHEATHING ARRANGEMENT FOR AN EXHAUST SYSTEM OF AN INTERNAL COMBUSTION ENGINE

CROSS REFERENCE TO RELATED APPLICATIONS

This application claims the benefit of priority under 35 U.S.C. § 119 of German Application 10 2020 109 186.9, filed Apr. 2, 2020, the entire contents of which are incorporated herein by reference.

TECHNICAL FIELD

The present invention pertains to a sheathing arrangement for an exhaust system of an internal combustion engine as well as to a process for manufacturing a sheathing arrangement for an exhaust system of an internal combustion engine.

TECHNICAL BACKGROUND

A sheathing arrangement for an exhaust system of an internal combustion engine is known from EP 3 591 182 A1. This prior-art sheathing arrangement comprises a sheathing element with a sheathing element shell, which is configured as a shaped sheet metal part, with a bottom wall adapted to the outer circumferential contour of the component to be sheathed, i.e., for example, of a muffler to be sheathed, and with a circumferential wall enclosing the bottom wall. Insulation material having a mat-like configuration is arranged in the interior which is enclosed by this shell-like structure of the sheathing element shell. The insulation material is held in a fixed manner between the sheathing element shell and the component to be sheathed in the assembled state, i.e., when the sheathing element encloses the component to be sheathed.

In order to ensure that a bond is present between the sheathing element shell and the insulation material before the sheathing of the component of the exhaust system, it is known, for example, to fix the insulation material by bonding to the sheathing element shell.

SUMMARY

An object of the present invention is to provide a sheathing arrangement for an exhaust system of an internal combustion engine as well as a process for manufacturing a sheathing arrangement for an exhaust system of an internal combustion engine, which sheathing arrangement and process guarantee a cost-effective, yet reliably effective configuration of a sheathing arrangement.

According to a first aspect of the present invention, this object is accomplished by a sheathing arrangement for an exhaust system of an internal combustion engine, comprising at least one sheathing element with a sheathing element shell and on an inner side of the sheathing element shell, insulation material overlapping the inner side in at least some areas, which inner side is to be positioned facing toward a component of an exhaust system, which component is to be sheathed, wherein the insulation material is fixed to the sheathing element shell by means of at least one fastening element passing through the sheathing element shell and the insulation material.

In case of the configuration according to the present invention, the insulation material is fixed to the associated sheathing element shell by steps that can be implemented in a technically simple manner, especially avoiding the use of adhesives. It is thus guaranteed that before applying such a sheathing arrangement or a sheathing element of same to an exhaust system of an internal combustion engine, the sheathing element shell and the associated insulation material are held together in a reliable manner and in a defined position, so that the sheathing element shell and the associated insulation material have the relative position to each other intended for the installed state during the sheathing of the component of an exhaust system, which component is to be sheathed, i.e., for example, of a muffler or of an exhaust gas treatment component. After sheathing the component of the exhaust system, the insulation material is held in a fixed and reliable manner between this component and the associated sheathing element shell, so that displacements of the insulation material leading to an incorrect position cannot occur.

In order to be able to provide a sufficient stability for the sheathing arrangement, on the one hand, and to guarantee that the at least one fastening element can be pushed through the sheathing element shell, on the other hand, it is proposed that in association with at least one, and preferably with each fastening element fixing the insulation material to the sheathing element shell the sheathing element shell have a fastening element receiving area with a wall thickness that is reduced in a shell area enclosing the fastening element receiving area in relation to a base wall thickness of the sheathing element shell.

Provisions may be made to this end, for example, that the wall thickness of the sheathing element shell be in the range of 0.2 mm to 0.4 mm, preferably about 0.3 mm in at least one, and preferably in each fastening element receiving area, and that the base wall thickness be in the range of 0.4 mm to 0.6 mm, preferably about 0.5 mm.

In order to avoid an excessive overhang of the fastening element on an outer side of the sheathing element, which outer side is to be positioned facing away from the component to be sheathed, it is proposed that at least one, and preferably each fastening element receiving area be formed by a recess provided on an outer side of the sheathing element shell, which outer side is to be positioned facing away from the component to be sheathed.

For a reliable fastening effect, at least one, and preferably each fastening element may have a U-shaped configuration, i.e., like a fastening clamp, wherein the two U-legs traverse the sheathing element shell and the insulation material and are bent, preferably toward one another, in their sections which protrude on an inner side of the insulation material, which inner side is facing toward a component to be sheathed, such that at least one of these sections adjoins the inner side of the insulation material, and wherein a connection web connecting the two U-legs adjoins an outer side of the sheathing element shell, which outer side is to be positioned facing away from the component to be sheathed.

The insulation material may have a mat-like configuration, i.e., may be configured, for example, as a single-layer or multilayer fiber mat or material. Further, provisions may be made for a stable bond for the insulation material to be fixed to the sheathing element shell by means of a plurality of fastening elements.

In order to obtain a configuration that is resistant to environmental effects and thermal effects, the sheathing element shell may be a shaped sheet metal part.

According to another aspect, the object mentioned in the introduction is accomplished by a process for manufacturing a sheathing arrangement for an exhaust system of an internal combustion engine, wherein the sheathing arrangement comprises at least one sheathing element with a sheathing element shell and on an inner side of the sheathing element shell insulation material overlapping the inner side in at least some areas, which inner side is to be positioned facing toward a component of an exhaust system, which component is to be sheathed, wherein the process comprises the steps:

a) formation of a sheathing element shell for the at least one sheathing element,
   b) formation of insulation material to be arranged on the inner side of the sheathing element shell,
   c) arrangement of the insulation material on the inner side of the sheathing element shell, and
   d) fixing of the insulation material to the sheathing element shell by at least one fastening element passing through the sheathing element shell and the insulation material.

In this process, in order to make it easily possible to push the at least one fastening element through the sheathing element shell in the case of a configuration which is, nevertheless, stable, step a) may comprise the formation of the sheathing element shell with at least one fastening element receiving area with a wall thickness that is reduced in a shell area enclosing the fastening element receiving area in relation to a base wall thickness of the sheathing element shell.

Provisions may especially be made for this for step a) to comprise the formation of the sheathing element shell with a base wall thickness in the range of 0.4 mm to 0.6 mm, preferably about 0.5 mm, and the formation of the sheathing element shell with a wall thickness in the range of 0.2 mm to 0.4 mm, preferably about 0.3 mm, in at least one fastening element receiving area, or/and for a recess to be formed in step a) for the formation of at least one fastening element receiving area on an outer side of the sheathing element shell, which outer side is to be positioned facing away from the component to be sheathed.

For a heat-resistant configuration, it is being proposed that the sheathing element shell be formed as a shaped sheet metal part in step a).

Especially when the sheathing element shell is formed as a shaped sheet metal part, in step a) the at least one fastening element receiving area may be formed by material-displacing machining or/and material-removing machining of a sheet metal blank used for the formation the sheathing element shell. This process for producing a fastening element receiving area may be carried out on the sheet metal blank before the shaping of same to obtain the desired shape of the sheathing element shell, or can be carried out while the sheet metal blank is shaped or after the sheet metal blank has already been shaped to obtain this desired shape.

The insulation material may be provided as a mat-like insulation material in step b).

For a stable bond which is easy to produce, it is being proposed that in step d) at least one U-shaped fastening element having two U-legs be pushed with its U-legs through the sheathing element shell and the insulation material, so that a connection web connecting the two U-legs adjoins an outer side of the sheathing element shell, which outer side is to be positioned facing away from the component to be sheathed, and that the two U-legs protrude on an inner side of the insulation material, which inner side is facing toward the component to be sheathed, and are bent, preferably toward one another, with their sections protruding on the inner side of the insulation material, such that at least one of these sections adjoins the inner side of the insulation material.

To avoid unnecessary production costs while also taking into consideration the fact that the fixing by one or more fastening elements for a bond guaranteeing the necessary position of the insulation material in relation to the associated sheathing element shell is sufficient, it is further proposed according to the present invention that no other steps for fixing the insulation material to the sheathing element shell be carried out aside from step d) for fixing the insulation material to the sheathing element shell by at least one fastening element.

The present invention further pertains to an exhaust system with at least one component sheathed with a sheathing arrangement configured according to the present invention, which is preferably manufactured with a process according to the present invention.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
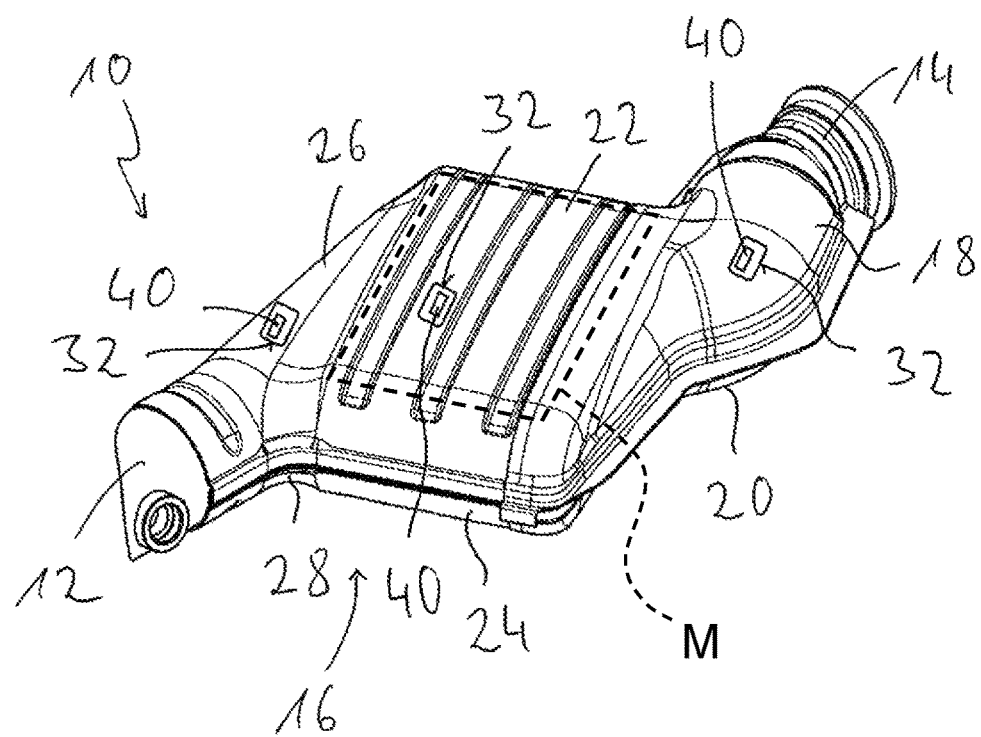
FIG. 1 is a partial area of an exhaust system with a sheathing arrangement sheathing a component (shown schematically in dashed line) of the exhaust system.

Referring to the drawings, a partial area of an exhaust system of an internal combustion engine, which exhaust system is generally designated by 10, can be seen in FIG. 1. The exhaust system 10 comprises between tubular exhaust gas-carrying elements 12, 14 a component M, e.g., a muffler, which is enclosed by a sheathing arrangement 16 and therefore cannot be seen, such that it is shown in FIG. 1 in dashed line.

The sheathing arrangement 16 shown in FIG. 1 comprises a plurality of sheathing elements 18, 20, 22, 24, 26, 28, which are associated with each other in pairs. Each of the sheathing elements 18, 20, 22, 24, 26, 28 forms with the respective sheathing element complementary to it an area of the sheathing 16, which area of sheathing 16 fully encloses the exhaust system 10 or the component to be sheathed, wherein the sheathing elements 18, 20 and 22, 24 and 26, 28, which are complementary to each other, can be permanently connected to each other, for example, by flanging and/or by connection in substance, e.g., welding in edge areas adjacent to one another.

To achieve an improved shielding of the component of the exhaust system 10, which component is to be sheathed, preferably mat-like insulation material is preferably provided on one side of a respective sheathing element shell, which side is associated with the component to be sheathed, in case of all the sheathing elements 18, 20, 22, 24, 26, 28. This insulation material, comprising, for example, one or more layers of fiber material or foamed material, is held in a stable manner between the respective sheathing element shell of the sheathing elements 18, 20, 22, 24, 26, 28 and the sheathed component in the assembled state shown in FIG. 1.

Before assembly of the exhaust system 10, it must, however, be ensured that a sheathing element shell of a respective sheathing element 18, 20, 22, 24, 26, 28 and the insulation material 38 provided on it be held together in order to guarantee that during the assembly or even after the assembly, the insulation material has the position intended for it in relation to the associated sheathing element shell, on the one hand, and in relation to the component to be sheathed, on the other hand.

Figure 2:
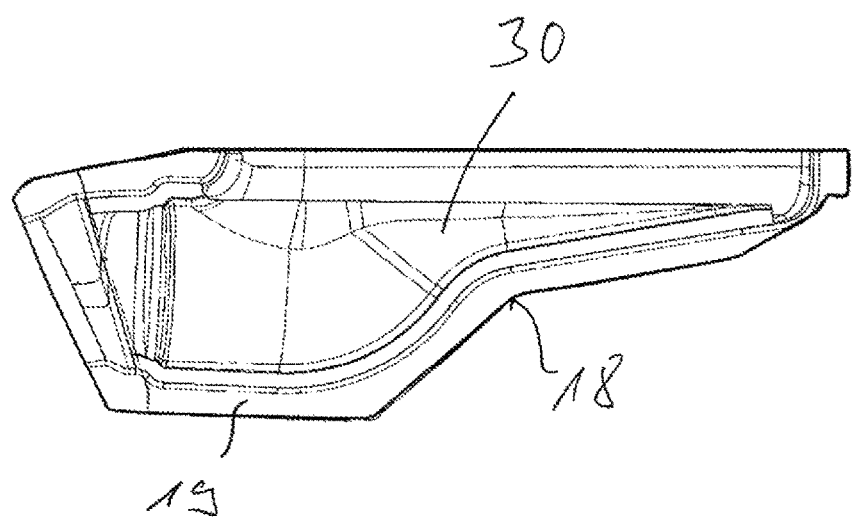
FIG. 2 is a side view of a sheathing shell element of the sheathing arrangement from FIG. 1.
Figure 3:
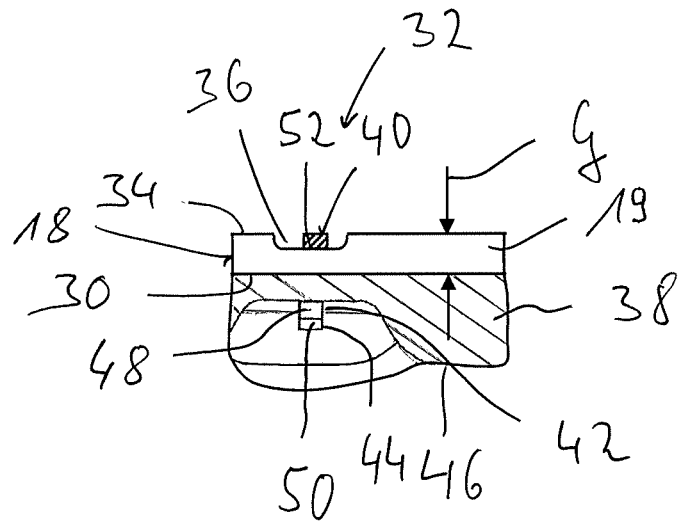
FIG. 3 is a detail sectional view of a sheathing shell element connected to insulation material.
Figure 4:
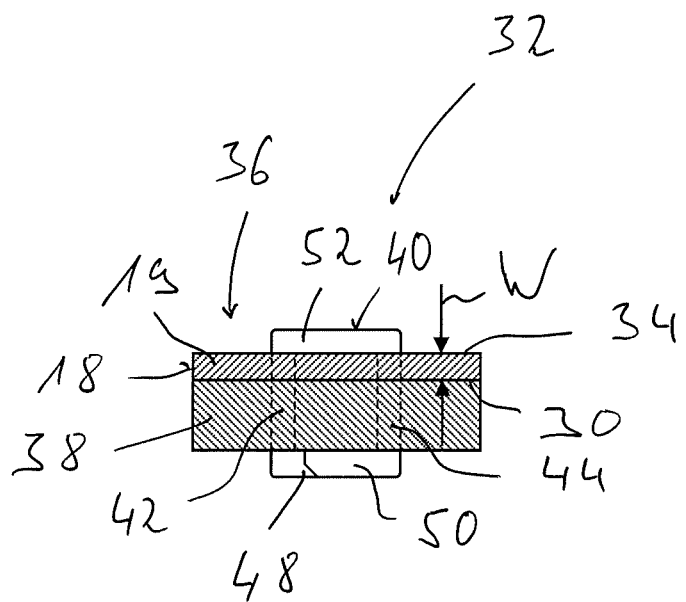
FIG. 4 is another detail sectional view of the sheathing shell element connected to the insulation material.

In order to guarantee this defined position, the insulation material is fixed by means of at least one fastening element to the associated sheathing element in case of at least one, and preferably each of the sheathing elements 18, 20, 22, 24, 26, 28. This is illustrated in FIGS. 3 and 4 in reference to the sheathing element 18 shown in FIG. 2 or the sheathing element shell 19 thereof. The following explanation thus likewise also applies to the bonding of a respective insulation material in case of the other sheathing elements 20, 22, 24, 26, 28.

At least one fastening element receiving area 32 is provided on the sheathing element shell 19 of the sheathing element 18. This fastening element receiving area 32 is formed by a recess 36 being formed on an outer side 34 of the sheathing element shell 19, which outer side is to be positioned facing away from the component to be sheathed. This recess 36 may be formed during the manufacture of the sheathing element shell 19 during the shaping of a sheet metal blank by material being displaced by using a corresponding shaping tool where a fastening element receiving area 32 or a recess 36 shall be formed. This may take place in the course of the shaping of the sheet metal blank to obtain the shape of the sheathing element shell 19 shown in FIG. 2, so that no additional operation is necessary. As an alternative, the recess 36 may be formed by a corresponding deforming tool before or after the shaping of the sheet metal blank to obtain the desired shape of the sheathing element shell 19. As an alternative or in addition, it is possible to form such a recess 36 by means of a material-removing operation.

For manufacturing the sheathing material shell 19, for example, sheet metal material with a base wall thickness G in the range of about 0.5 mm may be used. In the area of a recess 36 shown in an enlarged view in FIG. 4 or in the fastening element receiving area 32 having the recess 36, the wall thickness W may be about 0.3 mm after forming the recess 36.

After one or more such fastening element receiving areas 32 have been formed in the sheathing element shell 19 and the insulation material 38 provided in a mat-like configuration was positioned on the inner side 30 of the sheathing element shell 19, the insulation material 38 is fixed by means of a fastening element 40, which has, for example, the clamp-like configuration shown, to the sheathing element shell 19 in the fastening element receiving area 32 or in each fastening element receiving area 32. The fastening element 40, which is clamp-like, i.e., provided with an essentially U-shaped structure is pushed with its two U-legs 42, 44 from the outer side 34 in the area of a recess 36 through the sheathing element shell 19 and the insulation material 38 positioned on the inner side 30 of the sheathing element shell 19. Since the sheathing element shell 19 is provided with a comparatively smaller wall thickness W in the fastening element receiving area 32 or in each fastening element receiving area 32, it is not necessary to use fastening elements 40 with excessively large dimensions in order to guarantee that the U-legs 42, 44 of the clamp-like fastening element 40 are not deformed during the operation of the pushing through the sheathing element shell 19.

After pushing the fastening element 40 through the sheathing element shell 19 and the insulation material 38, the U-legs 42, 44 are preferably bent toward one another, wherein, as can be seen in FIG. 3, the insulation material 38, which is, in principle, very flexible, is pressed against the inner side 30 of the sheathing element shell 19 and in the process is compressed. The sections 48, 50 of the U-legs 42, 44, which sections are bent toward one another, can occupy different positions in relation to one another in this state. FIG. 3 shows a state, in which the bent section 50 of the U-leg 44 overlaps the bent section 48 of the U-leg 42 on the side thereof, which side is facing away from the insulation material 38, so that essentially only the bent section 48 of the U-leg 42 touches the insulation material 38. FIG. 4 illustrates a state, in which the two bent sections 48, 50 of the U-legs 42, 44 are located next to one another and overlapping one another. Provisions could also be made, in principle, for the U-legs 42, 44 to be dimensioned such that the sections 48, 50, which are bent toward one another and adjoin the insulation material 38 on the inner side 46 of the insulation material 38, extend toward one another, but do not overlap one another. The sections 48, 50 could also be bent away from one another.

The provision of the recess 36 of a respective fastening element receiving area 32 on the outer side 34 of the sheathing element shell 19 has the advantage that after the insertion of a fastening element 40, a connection web 52 connecting the two U-legs 42, 44 on the outer side 34 of the sheathing element shell 19 is, for example, essentially entirely received in the recess 36, and thus does not protrude in the outwards direction.

By using such deformable fastening elements made, for example, of metallic material, it is possible to fix the insulation material to the respective associated sheathing element shell in a simple and reliably effective manner, so that it is guaranteed for a mounting operation to be carried out later for sheathing a component of an exhaust system that the insulation material retains its position intended for this. Additional steps, e.g., the bonding of the insulation material with the respective associated sheathing element shell, are not necessary.

While specific embodiments of the invention have been shown and described in detail to illustrate the application of the principles of the invention, it will be understood that the invention may be embodied otherwise without departing from such principles.

What is claimed is:

1. A sheathing arrangement for an exhaust system of an internal combustion engine, the sheathing arrangement comprising:
    at least one sheathing element comprising a sheathing element shell having a shell inner side configured to be positioned facing toward a component of the exhaust system, which component is to be sheathed;
    insulation material overlapping the shell inner side in at least some areas; and at least one fastening element passing through the sheathing element shell and the insulation material and fixing the insulation material to the sheathing element shell, wherein:
- at least one fastening element of the at least one fastening element has a U-shaped configuration with two U-legs and a connection web connecting the two U-legs;
- the two U-legs traverse the sheathing element shell and the insulation material;
- each of the U-legs has a section protruding on an insulation inner side of the insulation material, which insulation inner side is to be positioned facing toward a component to be sheathed, with each section bent as a bent section such that at least one of the bent sections adjoins the insulation inner side of the insulation material;
- a connection web connecting the two U-legs adjoins a shell outer side of the sheathing element shell, which shell outer side is to be positioned facing away from the component to be sheathed, wherein:
- the bent section of one of the U-leg adjoins the insulation inner side of the insulation material and the bent section of the other one of the U-legs overlaps the bent section of the one of the U-legs on a side thereof facing away from the insulation material, so that only the bent section of the one of the U-legs adjoins the insulation material; or
- the bent sections of the U-legs are positioned next to one another and overlapping one another, so that the bent section of each one of the U-legs adjoins the insulation material.

2. The sheathing arrangement in accordance with claim 1, wherein the sheathing element shell has a fastening element receiving area in association with the at least one fastening element fixing the insulation material to the sheathing element shell, the fastening element receiving area having a wall thickness that is reduced, in a shell area enclosing the fastening element receiving area, in relation to a base wall thickness of the sheathing element shell.

3. The sheathing arrangement in accordance with claim 2, wherein:
- the wall thickness of the fastening element receiving area of the sheathing element shell is in a range of 0.2 mm to 0.4 mm; and
- the base wall thickness of the sheathing element shell is in a range of 0.4 mm to 0.6 mm.

4. The sheathing arrangement in accordance with claim 2, wherein the fastening element receiving area is formed by a recess provided on an outer side of the sheathing element shell, which outer side is to be positioned facing away from the component to be sheathed.

5. The sheathing arrangement in accordance with claim 1, wherein:
- the insulation material has a mat configuration; or
- the sheathing arrangement comprises at least one additional fastening element to provide a plurality of fastening elements with the insulation material fixed to the sheathing element shell by means of the plurality of fastening elements; or
- the insulation material has a mat configuration and the sheathing arrangement comprises at least one additional fastening element to provide a plurality of fastening elements with the insulation material fixed to the sheathing element shell by means of the plurality of fastening elements.

6. The sheathing arrangement in accordance with claim 1, wherein the sheathing element shell is a shaped sheet metal part.

7. An exhaust system comprising at least one component sheathed and a sheathing arrangement, the sheathing arrangement comprising:
- at least one sheathing element comprising a sheathing element shell having a shell inner side configured to be positioned facing toward a component of the exhaust system, which component is to be sheathed;
- insulation material overlapping the shell inner side in at least some areas; and
- at least one fastening element passing through the sheathing element shell and the insulation material and fixing the insulation material to the sheathing element shell, wherein:
- at least one fastening element of the at least one fastening element has a U-shaped configuration with two U-legs and a connection web connecting the two U-legs;
- the two U-legs traverse the sheathing element shell and the insulation material;
- each of the U-legs has a section protruding on an insulation inner side of the insulation material, which insulation inner side is to be positioned facing toward a component to be sheathed, with each section bent as a bent section such that at least one of the bent sections adjoins the insulation inner side of the insulation material;
- a connection web connecting the two U-legs adjoins a shell outer side of the sheathing element shell, which shell outer side is to be positioned facing away from the component to be sheathed, wherein:
- the bent section of one of the U-leg adjoins the insulation inner side of the insulation material and the bent section of the other one of the U-legs overlaps the bent section of the one of the U-legs on a side thereof facing away from the insulation material, so that only the bent section of the one of the U-legs adjoins the insulation material; or
- the bent sections of the U-legs are positioned next to one another and overlapping one another, so that the bent section of each one of the U-legs adjoins the insulation material.

8. The exhaust system in accordance with claim 7, wherein:
- the sheathing element shell has a fastening element receiving area in association with the at least one fastening element fixing the insulation material to the sheathing element shell, the fastening element receiving area having a wall thickness that is reduced, in a shell area enclosing the fastening element receiving area, in relation to a base wall thickness of the sheathing element shell; and
- the fastening element receiving area is formed by a recess provided on a shell outer side of the sheathing element shell, which outer side is to be positioned facing away from the component to be sheathed.

9. The exhaust system in accordance with claim 7, wherein:
- the insulation material has a mat configuration; or
- the sheathing arrangement comprises at least one additional fastening element to provide a plurality of fastening elements with the insulation material fixed to the sheathing element shell by means of the plurality of fastening elements; or the insulation material has a mat configuration and the sheathing arrangement comprises at least one additional fastening element to provide a plurality of fastening elements with the insulation material fixed to the sheathing element shell by means of the plurality of fastening elements.

10. The exhaust system in accordance with claim 7, wherein the exhaust system is formed by a process comprising the steps of:
    forming the sheathing element shell;
    forming the insulation material to be arranged on the inner side of the sheathing element shell;
    arranging the insulation material on the shell inner side of the sheathing element shell; and
    fixing of the insulation material to the sheathing element shell by the at least one fastening element passing through the sheathing element shell and passing through the insulation material.

11. The exhaust system in accordance with claim 10, wherein:
    fixing of the insulation material to the sheathing element shell comprises:
    pushing the U-legs through the sheathing element shell and the insulation material so that the connection web connecting the two U-legs adjoins the outer side of the sheathing element shell, and that the two U-legs protrude on the inner side of the insulation material; and
    bending the two U-legs to provide the bent sections protruding on the inner side of the insulation material such that at least one of the U-leg sections adjoins the inner side of the insulation material.

12. A sheathing arrangement for an exhaust system of an internal combustion engine, the sheathing arrangement comprising:
    at least one sheathing element comprising a sheathing element shell having a shell inner side configured to be positioned facing toward a component of the exhaust system, which component is to be sheathed;
    insulation material overlapping the shell inner side in at least some areas; and
    a fastening element passing through the sheathing element shell and the insulation material and fixing the insulation material to the sheathing element shell, wherein:
    the fastening element has a U-shaped configuration with two U-legs and a connection web connecting the two U-legs;
    the two U-legs traverse the sheathing element shell and the insulation material;
    each of the U-legs has a section protruding on an insulation inner side of the insulation material, which insulation inner side is to be positioned facing toward a component to be sheathed, with each section bent as a bent section such that at least one of the bent sections adjoins the insulation inner side of the insulation material;
    a connection web connecting the two U-legs adjoins a shell outer side of the sheathing element shell, which shell outer side is to be positioned facing away from the component to be sheathed;
    the bent section of one of the two U-legs overlaps the bent section of another one of the two U-legs.

13. The sheathing arrangement in accordance with claim 12, wherein:
    only the bent section of the one of the U-legs is in contact with the insulation inner side of the insulation material and the bent section of the another one of the two U-legs overlaps the bent section of the one of the U-legs on a side thereof facing away from the insulation material; or
    the bent section of each one of the U-legs adjoins the insulation material.

14. The sheathing arrangement in accordance with claim 13, wherein the sheathing element shell has a fastening element receiving area in association with the at least one fastening element fixing the insulation material to the sheathing element shell, the fastening element receiving area having a wall thickness that is reduced, in a shell area enclosing the fastening element receiving area, in relation to a base wall thickness of the sheathing element shell.

15. The sheathing arrangement in accordance with claim 14, wherein:
    the wall thickness of the fastening element receiving area of the sheathing element shell is in a range of 0.2 mm to 0.4 mm; and
    the base wall thickness of the sheathing element shell is in a range of 0.4 mm to 0.6 mm.

16. The sheathing arrangement in accordance with claim 14, wherein the fastening element receiving area is formed by a recess provided on an outer side of the sheathing element shell, which outer side is to be positioned facing away from the component to be sheathed.

17. The sheathing arrangement in accordance with claim 13, wherein:
    the insulation material has a mat configuration; or
    the sheathing arrangement comprises at least one additional fastening element to provide a plurality of fastening elements with the insulation material fixed to the sheathing element shell by means of the plurality of fastening elements; or
    the insulation material has a mat configuration and the sheathing arrangement comprises at least one additional fastening element to provide a plurality of fastening elements with the insulation material fixed to the sheathing element shell by means of the plurality of fastening elements.

18. The sheathing arrangement in accordance with claim 13, wherein the sheathing element shell is a shaped sheet metal part.

* * * * *